June 20, 1933.  C. S. MINER  1,914,522
SOLVENTS FOR CELLULOSE MATERIALS
Filed March 15, 1928
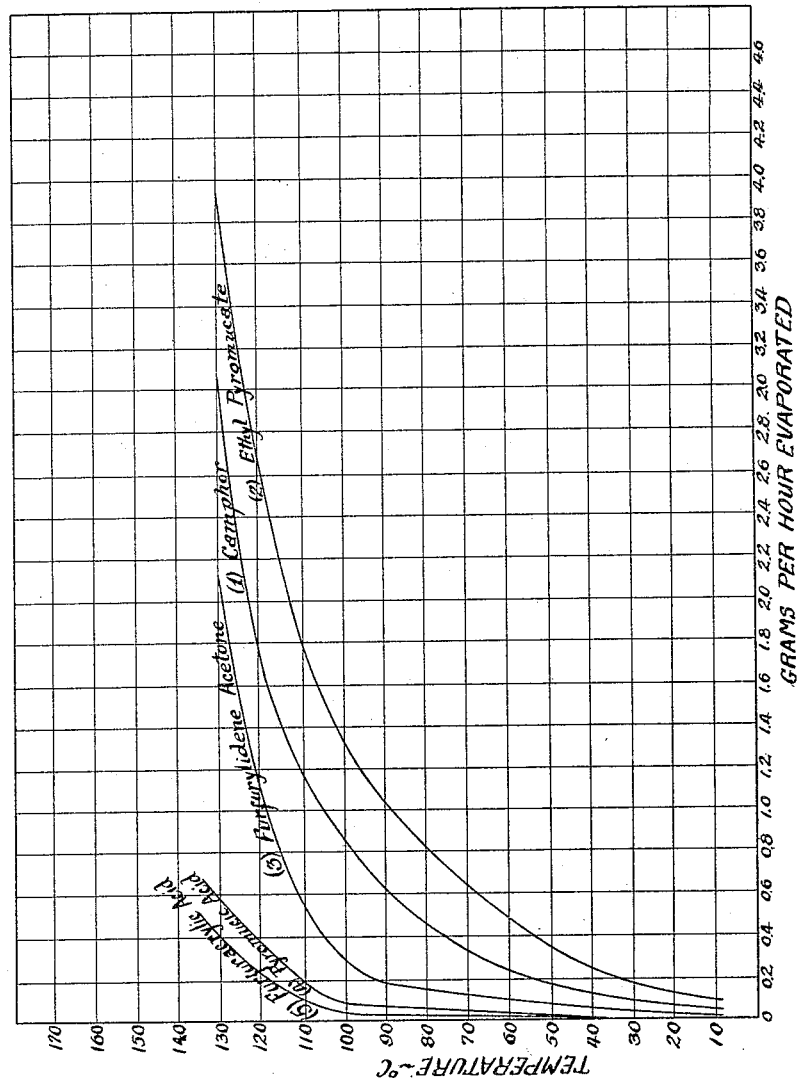
Inventor:
Carl S. Miner.
By Jones, Addington, Ames & Seibold
Attys Patented June 20, 1933

1,914,522

UNITED STATES PATENT OFFICE

CARL S. MINER, OF CHICAGO, ILLINOIS, ASSIGNOR TO THE QUAKER OATS COMPANY, OF CHICAGO, ILLINOIS, A CORPORATION OF NEW JERSEY

SOLVENTS FOR CELLULOSE MATERIALS

Application filed March 15, 1928. Serial No. 261,823.

My invention relates to solvents for cellulose derivatives and it has special reference to solvents of the class frequently designated as latent or solid solvents whereby the mass comprising cellulose derivatives and mixed with my improved latent solvent, in proper proportions, will be rendered plastic or readily moldable when subjected to suitable conditions of heat and pressure.

More particularly my invention relates to improved latent solvents for cellulose derivatives that serve as highly desirable substitutes for the solid or latent solvents heretofore employed in the manufacture of molded articles, such as toilet articles, ornaments and other contrivances manufactured from celluloid.

Another object of my invention is the use of my new solvents in combination with other solvents in the preparation of film-forming lacquers in which a solution of a suitable cellulose derivative, such as cellulose nitrate, cellulose acetate or cellulose ethyl ether may be made, the solvent comprising furane derivatives such as ethyl pyromucate.

By the term "cellulose derivatives", as employed herein, I refer to those substances (cellulose esters and cellulose ethers) which are well known in the art as forming the basis of film-forming lacquers as well as of those cellulose plastics, such as celluloid and other pyroxylin plastics, that are referred to above as being rendered plastic or readily moldable when subjected to suitable conditions of heat and pressure and which are employed in the manufacture of molded articles. While cellulose derivatives, such as the cellulose esters and the cellulose ethers, form the basis of my composition of material, it is conceivable that other cellulose derivatives will act in a similar manner.

In the manufacture of molded articles made from cellulose derivatives and employing solid or latent solvents for the purpose of rendering the admixed materials plastic under the proper conditions, camphor and acetanilide have proved useful in certain instances while the following solid solvents; namely, chloral, naphthalene, phenol, ethyl stearate, have been suggested for this use, although I am not aware that they have ever been used commercially.

In certain instances, it is desirable for the solid or latent solvent of the admixture comprising the cellulose derivatives to be relatively volatile in order that the solvent may be expelled subsequently from the mixture and, in other instances, it is desirable to retain in the finished product a considerable portion of the latent solvent. As an example of the latter instance, in the manufacture of transparent articles it is desirable that the transparency of the material be maintained for an indefinite period but this condition heretofore has been approximated only by camphor as the single latent solvent suitable in any degree for this purpose. However, camphor is not a completely satisfactory solvent in view of the fact that it does evaporate slightly and by the loss of camphor from the admixture the articles intended to be transparent become clouded. While my present invention appertains to the making of transparent articles by means of cellulose derivatives, it is to be understood that I do not intend to be limited to transparent articles only, since my invention is capable of being applied to a great variety of articles other than those which, in their finished state, are transparent.

By means of my present invention, I have discovered substitutes for camphor or other known solid or latent solvents for the purposes indicated above. From my newly discovered solvents for cellulose esters, I am able to select certain latent solvents that will evaporate from the admixture at a negligibly slow rate, thus ensuring, if it is so desired, that the transparency of the material will be substantially permanent or at least maintained for a period of time greatly in excess of that obtaining when camphor is used as the latent solvent for the cellulose esters. Again, I may select from my new latent solvents one that will evaporate from the admixture more readily than camphor and in certain instances this is highly desirable in order that the latent solvent may be expelled from the admixture in a short time relatively to the time required to expel camphor when it is used as a solvent.

My new solvents are cheap and economical to produce, convenient to work and posseses no properties that render them undesirable to handle. The cellulose admixtures comprising my latent solvents are stable when the solutions are cooled and the cellulose esters are readily soluble in my new latent solvents when in a fused state.

Other advantages accruing by reason of the use of my new latent solvents for cellulose esters will be apparent from the following description and appended drawing to which reference may now be had for a more complete understanding of my invention.

So far as I am aware, the liquids furfural and furfuralcohol are the only furfural compounds or homologues or derivatives that have been specially designated heretofore as being solvents for cellulose esters. I have discovered that the solid compounds containing the furane ring, to which compounds furfural belongs and is today the best known representative thereof although it is a liquid, are solvents, under conditions that I will refer to hereinafter, for derivatives of cellulose such as the cellulose esters and cellulose ethers which are the basis of the cellulose plastics or moldable compounds, that may or may not be transparent or which comprise in addition to the cellulose esters or cellulose ethers suitable fillers and the like.

The latent solvents of the furane type which I desire particularly to employ are those which are solid at ordinary temperatures, and the following compounds are representative of this group, the melting points and boiling points thereof being designated for the purpose of illustrating these particular properties of the specified compounds in question.

| Furane group solvent | Melting point | Boiling point |
|---|---|---|
| (1) Ethyl pyromucate | 34.5° C. | 197° C. |
| (2) Furfurylidene acetone | 37.5° C. | 229° C. |
| (3) Pyromucic acid | 133° C. | |
| (4) Furfuracrylic acid | 140° C. | 286° C. |

The structural formulæ for the above specified substances are as follows:

Ethyl pyromucate

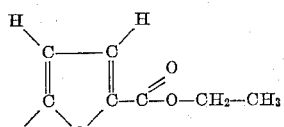

Furfurylidene acetone

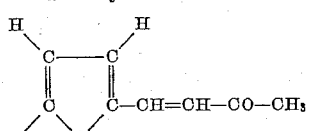

Pyromucic acid

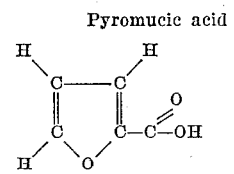

Furfuracrylic acid

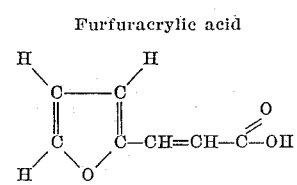

I have discovered that cellulose esters: e. g., cellulose nitrate and cellulose acetate, and that cellulose ethers: e. g., the ethyl ether, under proper conditions, are soluble in these solid compounds of the furane group, which I will designate as latent solvents for cellulose esters and ethers, and that there is no tendency towards separation when the admixed solutions or compounds are cooled. For the purpose of my present invention, I will classify ethyl pyromucate, furfurylidene acetone, pyromucic acid and furfuracrylic acid as furane derivatives comprising a carbonyl group, and it is evident that pyromucic acid and furfuracrylic acid can be further classified as furane derivatives comprising a carboxyl group and ethyl pyromucate as a furane derivative comprising a carboxy group.

As an illustration of a process employing my latent solvents for cellulose esters, I will cite a process that is adaptable for the manufacture of plastic cellulose compounds that are utilized for making molded articles, for instance, toilet articles, ornaments and the like. The cellulose ester, for example cellulose nitrate or cellulose acetate is first reduced to a fine state of subdivision, then my latent solvent is introduced, usually in an alcoholic solution, which solvent may be any of the solid derivatives and specifically and one of those that I have enumerated above. The mixture is worked to a uniform consistency after which the mixture is dried and pressed in order to remove the moisture and the more volatile parts of the solvent. The mixture is then rendered moldable or plastic under the action of heat and pressure whereby the cellulose materials dissolve in the solvent. When the material is in this state, it may be made into rough forms such as tubes, sheets, slabs, rings, etc., and after a certain amount of seasoning the rough forms are then ready for the manufacture of the finished products. In the foregoing illustrative example the solid furane derivatives mentioned serve as plasticizing agents.

The choice for any particular purpose of my latent solvents or plasticizing agents, constituting the solid furane derivative may be determined from the characteristic of each particular solvent. The curves of the accompanying drawing serve to illustrate some properties of the solvents that I have enumerated above and, in this instance, illustrate the relative rates of evaporation between camphor and certain representative latent or solid solvents of the furane group that are solvents of cellulose esters.

Curve No. 1 represents the rate of evaporation, measured in grams per hour, of camphor throughout a range of temperatures from 10° C. to approximately 130° C.; curve No. 2 illustrates the rate of evaporation of ethyl pyromucate throughout a range of temperature from 10° C. to substantially 130° C. and it is to be observed that the rate of evaporation of this furane compound is in excess of the rate of evaporation of camphor for the same range of temperatures; curve No. 3 is a corresponding curve illustrating the rate of evaporation of the furane compound furfurylidene acetone and shows that the rate of evaporation of this furane compound is less than the rate of evaporation of camphor; curve No. 4 illustrates the rate of evaporation for pyromucic acid throughout substantially the same range of temperatures; and curve No. 5 represents the rate of evaporation for furfuracrylic acid throughout the same range of temperatures as curve No. 4.

Comparing the curves, it is to be noted that at approximately 26° C., furfuracrylic acid and pyromucic acid have a substantially zero rate of evaporation and the rate of evaporation of furfurylidene acetone is substantially one-half of that of camphor. At 100° C., furfuracrylic acid has a negligible rate of evaporation, hyromucic acid has a rate of evaporation substantially equal to that possessed by camphor at 26° C. and camphor has a rate of evaporation greatly in excess of any one of the furane compounds represented in the graphs with the exception of ethyl pyromucate. At 125° C. the rate of evaporation of camphor is greatly in excess of the rate of evaporation of furfuracrylic acid and pyromucic acid and substantially midway between the rate of evaporation of furfurylidene acetone and ethyl pyromucate.

By comparing the curves of Fig. 1, it is to be observed that camphor is highly volatile when compared to furfuracrylic and pyromucic acids and that ethyl pyromucate is a more volatile compound that camphor. For certain types of celluloid, it may be desirable for the solid or latent solvent to be relatively volatile when compared to camphor in order that the solvent may be easily expelled from the finished product. On the other hand, as in transparent celluloids, it is highly desirable to retain in the finished product a considerable portion of the latent solvent in order that the celluloid material will not become clouded by reason of the loss of the solvent by evaporation. From the accompanying curves, it is to be noted that ethyl pyromucate is applicable as a latent solvent for cellulose esters when a solvent more readily volatile than camphor is desired. Furfuracrylic acid and pyromucic acid are but slightly volatile even up to 100° C., which property renders these two latent solvents of the furane group adaptable when it is desirable to retain the solid solvent in the final product.

As a second illustration of the practice of my present invention a formula for film forming lacquers comprising ethyl pyromucate is given, but it is to be understood that I am not to be limited to this specific formula. This formula may be

| | Parts |
|---|---|
| Cellulose nitrate (R. S. Cotton) | 162 |
| Ethyl pyromucate | 60 |
| Ester gum | 80 |
| Toluol | 338 |
| Butanol | 170 |
| Alcohol | 234 |
| Ethyl acetate | 170 |
| Butyl acetate | 170 |
| Furfural | 112 | wherein the quantities of the above ingredients are given by weight.

This application is a continuation in part of my application Serial No. 696,942, filed on March 5, 1924.

It is to be understood that my invention is not to be limited to the specific combinations and solvents described, but my new solvents may be used in combination with other solvents to accomplish the results desired.

I claim:

1. A composition of material comprising a cellulose ester and pyromucic acid.

2. A composition of material comprising cellulose nitrate and pyromucic acid.

3. A composition of material comprising a cellulose derivative and a furane derivative solid at ordinary temperatures and which is a solvent therefor and which is selected from the group consisting of ethyl pyromucate, furfurylidene acetone, pyromucic acid, and furfuracrylic acid.

4. A composition of material comprising a cellulose derivative and furfurylidene acetone.

5. A composition of material comprising a cellulose derivative and ethyl pyromucate.

In witness whereof, I have hereunto subscribed my name.

CARL S. MINER.